(No Model.)
F. SCHELP, Jr.
Vehicle Spring.
No. 235,301.  Patented Dec. 7, 1880.
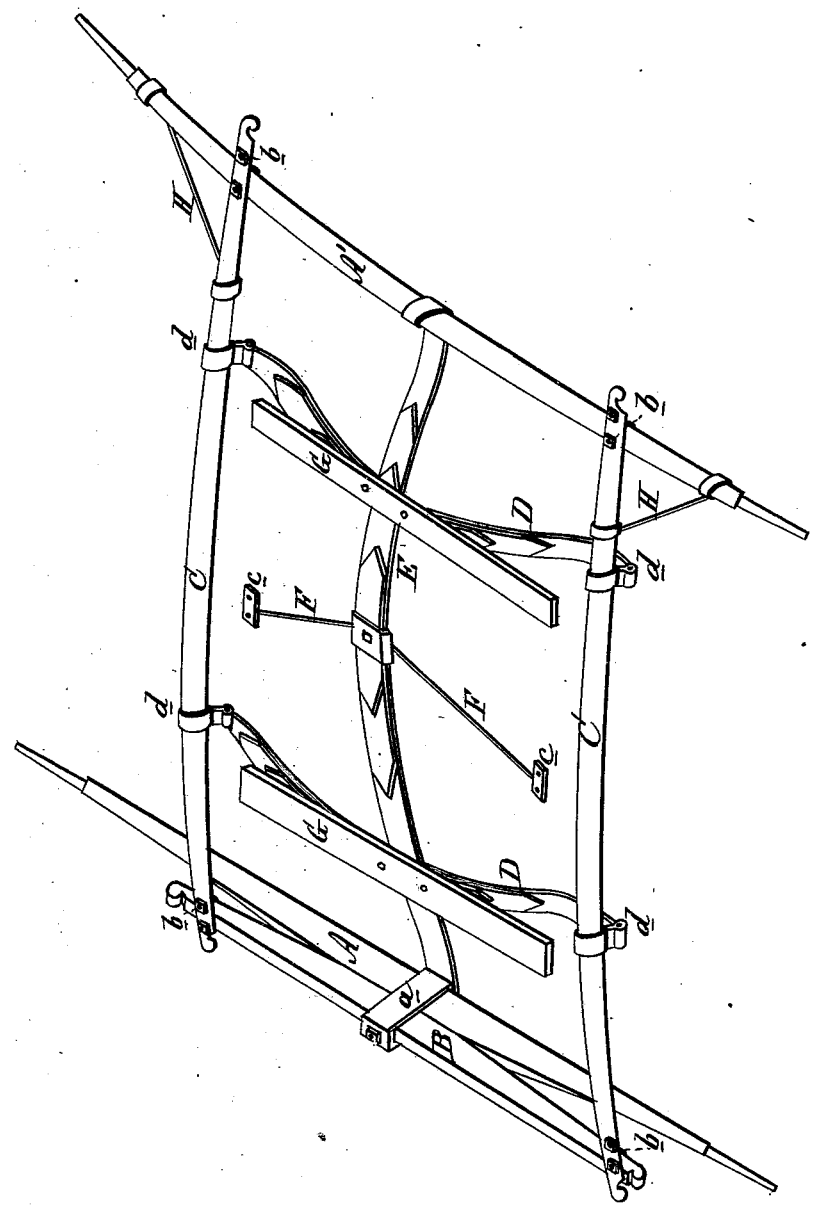
WITNESSES:
A. Schehl.
C. Sedgwick
INVENTOR:
F. Schelp Jr.
BY Munn & Co
ATTORNEYS.

United States Patent Office.

FRED. SCHELP, JR., OF BALLWIN, MISSOURI.

VEHICLE-SPRING.

SPECIFICATION forming part of Letters Patent No. 235,301, dated December 7, 1880.

Application filed October 11, 1880. (No model.)

*To all whom it may concern:*

Be it known that I, FRED. SCHELP, Jr., of Ballwin, in the county of St. Louis and State of Missouri, have invented a new and Improved Vehicle-Gear, of which the following is a specification.

The object of this invention is to provide a more elastic, easier-running, and stronger gear adapted to side-bar buggies and other vehicles.

The invention consists of a novel combination of side bars, springs, stay-rods, and head-blocks with the vehicle-axles.

The drawing represents a perspective view of the device.

In the drawing, A A' represent, respectively, the front and rear axles, and B the head-block, which is longer than those commonly in use, and is secured on the front axle, A, by strap $a$ or other suitable device.

C C are the two side bars, that are secured by clips $b$ $b$ on the upper faces of the axle A' and head-block B, as shown.

D D are the curved cross-springs, hung by clips $d$ $d$ on the side bars, C C, with their curved faces upward; and E is a long curved spring running midway between the side bars, C C, beneath and in contact with the springs D D, and suspended from the front and rear axles, A A'.

F F are the stay-rods extending upward and outward from the center of the spring E, and having plates $c$ $c$ on their ends, whereby said stay-rods F F may be attached to the body of the vehicle.

G G are transverse parallel plates, secured on top of the springs D D for the body of the vehicle to rest upon.

With this construction the weight of the vehicle will be supported by the springs D D E, and the latter, being substituted for the ordinary stiff coupling-pole, imparts to the gear great elasticity and enables the side bars, C C, to spring. Hence the vehicle provided with this gear will ride with more ease and less jarring than those provided with the ordinary gear, and with this gear the side motion is reduced to a minimum, because the side bars, C C, are not hung on springs, as in ordinary gears, but are secured upon the unyielding rear axle, A', and the head-block B, and the stay-rods F F also serve to prevent side motion of the body of the vehicle.

H H represent diagonal braces extending from the rear axle, A', to the side bars, C C, for the purpose of stiffening the device.

In riding over the roughest roads a vehicle provided with this gear will be protected from all violent strains or shocks by the elasticity of the gear, and hence the vehicle will last much longer.

I am aware that a somewhat similar gear has been made; but it has the longitudinal median spring connected with the front rocker (while mine passes under the front axle) to keep the front gear always in position. It also has a superposed steel plate, which stiffens the longitudinal spring and destroys the end motion, so that when the front wheels run over an obstacle the strain is taken by the front half of the spring, and if the hindmost wheels run over an obstacle on the rear half. This steel plate being connected at the ends with the cross-springs, a pushing or pulling strain is brought to bear upon said cross-springs, so as in a short time to cause them to rock. By connecting my long spring with the body by stay-rods all this push or pull upon the cross-springs is avoided.

What I claim as new and of my invention is—

In the gears of side-bar vehicles, the combination, with the side bars and cross-springs, of a median longitudinal spring, E, passing under the front and rear axles and connected with the body by stay-rods F, substantially as shown and described.

FRED. SCHELP, JR.

Witnesses:
FREDERIK SCHELP,
GEO. H. SCHELP.